United States Patent [19]
Gongwer et al.

[11] Patent Number: 6,138,120
[45] Date of Patent: Oct. 24, 2000

[54] SYSTEM FOR SHARING SERVER SESSIONS ACROSS MULTIPLE CLIENTS

[75] Inventors: Richard Scott Gongwer, Acton; Geoff Fred Lyon, Rockport; Weidong Chen, Newton; Catherine M. Lai, Lynnfield, all of Mass.

[73] Assignee: Oracle Corporation, Redwood Shores, Calif.

[21] Appl. No.: 09/100,387

[22] Filed: Jun. 19, 1998

[51] Int. Cl.$^7$ ..................................................... G06F 17/30
[52] U.S. Cl. ................... 707/10; 707/8; 707/9; 709/104; 709/226; 709/229
[58] Field of Search .................... 707/8, 9, 10, 202–204; 709/103–104, 203, 223, 226, 229, 303

[56] References Cited

U.S. PATENT DOCUMENTS

| | | | |
|---|---|---|---|
| 5,581,753 | 12/1996 | Terry et al. | 707/201 |
| 5,642,515 | 6/1997 | Jones et al. | 710/220 |
| 5,754,841 | 5/1998 | Carino, Jr. | 707/3 |
| 5,913,029 | 6/1999 | Shostak | 345/357 |
| 5,941,945 | 8/1999 | Aditham et al. | 709/205 |

OTHER PUBLICATIONS

"Uniting object–oriented and distributed system" Gulesian et al., DBMS, vol. 10, No. 8, pp. 84–89, Jul., 1997.

"An Internet collarborative environment for sharing Java applications," Abdel–Wahab et al., Porceedings of the 6th IEEE Computer Society Workshop on Future Trends of Distributed Computing, pp. 112–117, Oct., 1997.

"JavaBeans for the enterprise," Tom Valeski, e–Business Advisor, vol. 6, No. 4, pp. 30–34, Apr., 1998.

Primary Examiner—Hosain T. Alam
Attorney, Agent, or Firm—Hamilton, Brook, Smith & Reynolds, P.C.

[57] ABSTRACT

A session context on a server can be shared between multiple, independent clients by employing many-to-one mapping of sessions to session context. Once a session context is established on the server, the originating client associated with that context can share the context with other clients. The server can provide the client with a certificate identifying the session context. The client, in turn, can pass the certificate to other clients. By initiating a server session with the certificate, the server assigns the pre-existing session context to a new session for a new client. A plurality of clients can thereby interact with a shared session context. This allows the clients to cooperate in a groupware fashion.

54 Claims, 7 Drawing Sheets

SYSTEM FOR SHARING SERVER SESSIONS ACROSS MULTIPLE CLIENTS

BACKGROUND OF THE INVENTION

In previously implemented data server technologies, each independent client has a specific connection, session, and query/transaction status that is distinct from that of every other independent client. For example, in SQL database management systems, each client application creates a connection to the Database Management System (DBMS), a session context, and queries (opens a cursor) to support data fetching operations and update operations. Additionally, in many Structured Query Language (SQL) systems, stored procedures are invoked to help with cursor navigation or the processing of data elements. Both the cursor state and the execution of stored procedures using the cursor are completely private to one client application. Any sharing of data or processing resources, with other independent client applications, would have to be enabled by the originating client via a completely proprietary mechanism.

OnLine Analytical Processing (OLAP) data server systems provide technologies and techniques similar to SQL systems, but are distinguished by their data models and processing operations. OLAP data server systems have also, previously, provided data and processing operations to only one independent client application at a time.

One problem is that OLAP data servers allow data specialists to work with specific subsets of an analytical database for long periods of time, without updating or refreshing the data used, in order to support long sessions of incremental analysis with a stable base of data. Data updates are not available to other, independent clients because they exist only within the session and transaction context of the current client.

In certain OLAP application systems, another problem results from the integration of several independent client applications. Each client application is designed to run as a separate process and creates an independent relationship with the data server technology, but they need to act like one application when they interact with data.

SUMMARY OF THE INVENTION

As an example, an originating application (client) connects to a data server and creates a session, specifying that the session be brand new, and that the new session can be shared by future client connections. This client runs a query to specify the subset of data to be worked with, then calculates some new data values, using formulas that use the query subset as input. The originating client then desires to use another independent client to, for example, validate, via a statistical regression, the newly calculated data values, before committing those data values as updates to the database. To accomplish this, a mechanism is needed to permit sharing of the uncommitted data values between the independent clients.

A preferred embodiment of the invention is a system which formally supports the sharing of session, query, stored procedure, and transaction context across multiple, independent client applications. The system includes a number of discrete technologies and techniques.

In a general sense, a preferred embodiment of the invention operates on a server computer which has resources allocable for private use by clients. Typically, the resource being shared is a view of a database query or uncommitted database change data. A mechanism is provided where those resources on the server computer can be shared between a plurality of clients. The server recognizes the clients by assigning a respective identifier, called a session handle, to each client. In particular, the session handle is assigned from a pool of unassigned session handles.

Briefly, a private resource is first allocated by the server to the client which originated the private resource. Later, the server maps at least two identifiers, including the identifier for the originating client, to the private resource so the respective clients are in communication with the private resource.

More specifically, the resource is also assigned a handle from a pool of unassigned resource handles. The originating client interacts with the server using its unique session handle. The server maintains a map of session handles to resource handles so that the server can operate on the correct resource for the client. In particular, the originating client can fetch and modify data from a database.

Before committing the updated data, the originating client can command the server to provide a certificate which exposes the hidden resource handle. Armed with the certificate, the originating client can pass the certificate to other clients. With the certificate, a subsequent client can initiate a session with the server. Following authentication of the client, the server will map the new session to the old resource, instead of assigning a new resource to the new client session. Through this mapping of many session handles to a single resource handle, the resource can be shared across multiple, independent clients. Thus, both the originating and the subsequent clients can cooperate to interact with the same resource, e.g. uncommitted data.

The clients are preferably application programs. The application programs can be executing on common computer or on distinct computers. The distinct computers do not have to operate on a common network, and can even communicate with the server using different protocols. Preferably, all clients sharing a resource have equal privileges so that a resource will not be destroyed until all interested client sessions have terminated.

The task of logical access to the resource is with the clients. The server generally expects the clients to cooperatively manage their own access to shared resources in a groupware fashion. Because the clients are independent of one another, however, the server may receive an interaction request from one client before another interaction request from another client completes. To handle these requests, the server maintains an interaction queue to queue the received interaction requests in the order of arrival at the server. Each client receives the session state as left by the previous interaction from the previous client.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Session sharing in accordance with preferred embodiments of the invention includes a request, by an independent client application, to connect to an existing context of interaction with the data server, created previously, by another independent client application. In accordance with a preferred embodiment of the invention, a session context is implemented in Oracle Express Server from Oracle Corporation as an Express Server Workspace. The underlying implementation of transaction control is provided by the Workspace transaction mechanism described in co-pending application U.S. Ser. No. 08/961,743, "Context Management System For Modular Software Architecture" by R. Scott Gongwer et al., the teachings of which are incorporated herein by reference in their entirety. Embodiments of the invention preferably take the form of computer executable instructions embedded in a computer-readable format on a CD-ROM, floppy disk or hard drive, or another computer-readable distribution medium. In accordance with preferred embodiments of the invention, the computer programs implementing the invention are modularly constructed and destructed in accordance with co-pending application U.S. Ser. No. 08/866,744, "System for Dynamically Constructing an Executable Computer Program" by R. Scott Gongwer et al., the teachings of which are incorporated herein by reference in their entirety. The sessions and management processes are preferably embodied as processing threads in a free thread architecture.

In the following discussion, the term Workspace is used to describe a technological implementation of the physical management of session context. Session context is the sum of all component Workspaces associated with a session. Although preferred embodiments of the invention are described with reference to Workspaces, the invention can be used to share any session resource between clients. The following, general models show how session sharing can be used to solve the problems of the prior art.

Figure 1:
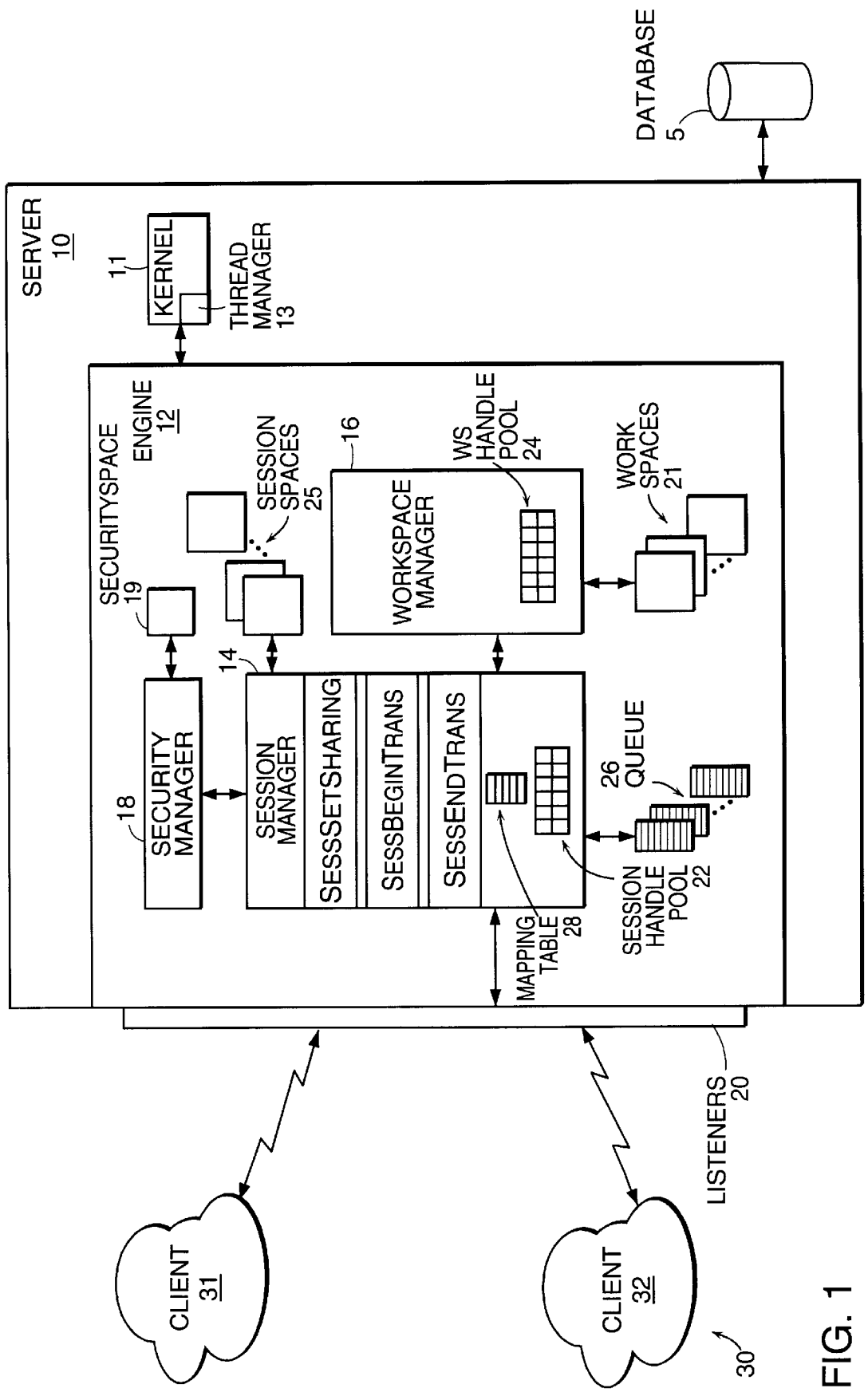
FIG. 1 is a schematic block diagram of a preferred session management system in accordance with the invention.

FIG. 1 is a schematic block diagram of a preferred session management system in accordance with the invention. As illustrated, at least one server serves requests for database data 5 from a plurality of clients 30. The server 10 includes a kernel 11 having a thread manager 13 and an engine 12. The thread manager 13 controls the assignment of threads to processing tasks from a pool of pre-instantiated threads. The engine 12, in a particular preferred embodiment of the invention, is embodied as an OLAP engine in Oracle Express Server, version 6.1, commercially available from Oracle Corporation. The engine 12 includes a session manager 14, a workspace manager 16, and a security manager 18. Data from the database 5 is stored in Workspaces 21 by the workspace manager 16. The server 10 also includes listeners 20 for interfacing the server 10 with the clients 30 over various network and communication protocols. Further details of the listeners 20 are also described in the above-referenced U.S. Ser. No. 08/961,743.

The workspace manager 16 includes a pool of workspace handles 24 available for assignment to Workspaces 21. In addition, the session manager 14 maintains a pool of session handles 22 available for assignment to client interaction sessions. The session manager 14 and the workspace manager 16 cooperate to map session handles 22 to workspace handles 24. In accordance with a preferred embodiment of the invention, the session handle to workspace handle mapping supports a many to one mapping so that a plurality of client sessions can share a single Workspace. This permits multiple clients to share query views and uncommitted server data. This mapping is preferably implemented in the session manager 14 as a mapping table 28.

It should be noted that the multiple clients accessing Workspace data operate independently of one another. Because of this independence, the server 10 can receive a request from one client for a Workspace while that Workspace is in use by another client. To manage these asynchronous requests, the session manager 14 maintains an interaction queue 26 of client requests (run program, update program, compile program, fetch data, update data, etc.) for the shared Workspace data. Preferably, the session manager 14 treats all clients as equals and services the requests in the interaction queue 26 in order of arrival at the server 10. In that case, the session manager 14 assumes that the clients are cooperating to share the Workspace in a logical fashion. It should be understood, however, that in an enhanced implementation the requests can be weighted to favor particular clients or compatible requests can be combined into a combined request. All such mechanisms for managing the interaction queue 26 are considered within the scope of the invention described herein.

Although the multiple sessions are sharing a session context, each session may require data which is exclusive to that session (e.g., error handling, etc.). This exclusive session data is maintained in respective Sessionspaces 25, otherwise similar to Workspaces 21, which bind to respective client sessions. In accordance with a preferred embodiment of the invention, the Sessionspaces 25 are implemented in accordance with the above-referenced U.S. Ser. No. 08/866,744. In particular, each client community can have a specific Sessionspace structure.

In order to protect a session context from inappropriate updates by sharing clients, a strong Workspace transaction model is provided. A transaction on a session includes a wide variety of potential updates including state information in memory, as well as database changes. The scope of any session's individual transaction (i.e., a package of interactions from one client) can be large. For instance, the invocation of an Express Server Stored Procedure Language (SPL) program, potentially containing thousands of discrete updates, is considered one transaction (or client interaction). All that matters to session sharing is that there are proper control mechanisms available. A session management mechanism via a session management interface is detailed below.

Another function that is part of the session transaction model is authorization. It is important for each user to be authorized as it gains transaction control of session context. For that reason, a session's authentication credentials are preferably used to authorize its interaction with the session. Each user sharing a session preferably have equivalent privileges for all session context resources, in order to transact with the session. Methods in the security manager 18 are called to perform the authorizations. In a preferred embodiment of the invention, the security manager 18 checks the authenticity of each and every requested interaction with a Workspace. The security manager 18 can have a Securityspace 19, constructed similarly to the Workspaces 21 and Sessionspaces 25, to maintain exclusive security data across sessions.

The session manager 14 includes three basic methods to implement Workspace sharing across multiple clients. First, a "sessSetSharing" method permits a session-originating client to make an unsharable session sharable, or a sharable session unsharable (assuming no current sharing). Second, a "sessBeginTransaction" method permits a session-sharing client to be authorized and start a session interaction, causing sharing sessions to wait for session access. Finally, a "sessEndTransaction" method permits a session-sharing client to terminate a session interaction, making the session available to a sharing session on the wait list.

The usage of Workspace transaction management to implement the session transaction control technique, as well as an example of how the wait queue operates for sharing sessions are detailed below. Before continuing with the description, it may be advantageous to introduce the following ANSI C interfaces and methods for session management.

A preferred session management interface can be described as follows:

```
/* Universally Unique Identifier (UUID) for this interface. */
#define SESSIONINITTERM_ID    {       \
                              0xb90a95c0, \
                              0x5926, \
                              0x11d0, \
                              0x85, \
                              0x71, \
                              {0x00, 0x00, 0xf8, 0x4a, 0x11, 0x8a}  \
                              }
#define SESSIONINITTERM_NAME "SessionInitTerm"
/* Signature for this interface. */
    typedef const struct
        {
        hsess(*sessionInit)(sessionParms * psessParms, securityParms*
            psecurityParms, clienttype client, xsbool newws, xsbool
            sharews, hws * wsHandle, ub4 sessDataSize, xsbool(
            *sessionspacemethod)(SESSIONSPACEMETHOD, void *));
        OESRESULT(*sessionTerm)(hsess sessHandle);
        OESRESULT(*sessBeginTransaction)(hsess sessHandle, ws ***pwsArray,
            void **psessData);
        OESRESULT(*sessEndTransaction)(hsess sessHandle);
        xsbool(*sessIsSessionSharingEnabled)(void);
        xsbool(*sessIsSessionShared)(hsess sessHandle);
        xsbool(*sessIsSessionSharable)(hsess sessHandle);
        OESRESULT(*sessSetSharing)(xsbool sharestate, hsess sessHandle);
        sb4(*sessGetNumberOfSessions)(hsess sessHandle);
        sb4(*sessGetNumberOfSessionsByWorkspace)(hws wsHandle);
        OESRESULT(*sessRequestSharedWs)(hsess sessHandle, notifyItem*
            pNotifyItem, notifyT * notify);
        OESRESULT(*sessCancelSharedWsRequest)(hsess sessHandle, notifyItem
            *pNotifyItem, notifyT * notify);
        xsbool(*sessCancelAllSharedWsRequests)(hws wsHandle);
        clienttype(*sessGetCurrentClientTypeByWorkspace)(WSADECL);
        } ifSessInitTerm_1;
A preferred session to Workspace interface can be described as follows:
/* UUID for this interface. */
#define SESSIONWS_ID {0x07b35e20,0xfac2,0x11d0,0x86,0x26,
                      {0x00,0x00,0xf8,0x4a,0x11,0x8a}}
#define SESSIONWS_NAME "SessionWorkspace"
/* Signature for this interface. */
    typedef const struct
        {
        xsbool(*SessionTableInitialize)(void);
        xsbool(*SessionTableDeinitialize)(void);
        hsess(*SessionCreate)(sessionParms * psessParms, securityParms*
            psecurityParms, clienttype client, xsbool newws, xsbool
            sharews, hws * pwsHandle, ub4 sessDataSize, xsbool(
            *sessionspacemethod)(SESSIONSPACEMETHOD, void *));
        xsbool(*SessionDestroy)(hsess);
        Session *(*SessionFind)(hsess);
        xsbool(*SessionTableUpdate)(hsess, SessionTableEntry *);
        ub4(*SessionsActiveCount)(void);
        ub4(*SessionCountWsShares)(hws wsHandle);
        xsbool(*SessionFindNextHandle)(Session **);
        xsbool(*SessionFindNextHandleByWs)(Session **pSession, hws
            wsHandle);
        ub4(*SessionGetSessionHandles)(hsess SessionHandleArray[], ub4
            arraySize);
        xsbool(*SessionAdd)(hsess SessionHandle, SessionTableEntry *
            SessEntry);
        xsbool(*sessionUpdateBeginXactionCounters)(hsess sessHandle,
            wsinfostruct * pwsinfo);
        xsbool(*sessionUpdateEndXactionCounters)(hsess sessHandle,
            wsinfostruct * pwsinfo);
        } ifSessWs_1;
```

A preferred Workspace management interface for all classes of modules can be described as follows:

```
#include "twsmgmt.h"
/* UUID for this interface. */
#define WORKSPACEMGMT_ID {        \
                0x8D89A940,       \
                0x144F,           \
                0x1069,           \
                0x84,             \
                0xED,             \
                {0x00, 0x00, 0xF6, 0x0E, 0x0D, 0xB6}\
                }
/* Signature for this interface. */
    typedef const struct
        {
        xsbool(*wmAddMod)(const hmod modHandle, sword * pmodWsIndex);
        align *(*wmFSGET)(sb4 nchars, ub2 objtype, ub2 zone);
        void (*wmFSRLS)(void *objptr);
        ws *(*wmFind)(const hws wsHandle, const hmod modHandle);
        ws *(*wmFindWss)(const hws wsHandle, const hmod modHandle);
        ws **(*wmFindWsa)(const hws wsHandle);
        xsbool(*wmFreeWsa)(ws **embedded_const wsArray);
        xsbool(*wmDeleteMod)(const hmod modHandle);
        ub4(*wmCountWs)(const hmod modHandle);
        xsbool(*wmDumpWs)(const hws wsHandle, const hmod modHandle, text
            * const target);
        ub4(*wmGetWsHandles)(hws wsHandleArray[ ], ub4 arraySize);
        xsbool(*setWSTransactionState)(hws wsHandle, wsstate currstate,
            wsstate newstate);
        xsbool(*getWSTransactionState)(hws wsHandle, wsstate *);
        xsbool(*setWSSharingState)(hws wsHandle, xsbool newstate);
        xsbool(*getWSSharingState)(hws wsHandle, xsbool * currstate);
        xsbool(*setWSSharedState)(hws wsHandle, xsbool newstate);
        xsbool(*getWSSharedState)(hws wsHandle, xsbool * currstate);
        ub4(*getWSNumberOfShares)(hws wsHandle);
        xsbool(*wmIsSessionSharingEnabled)(void);
        wsinfostruct *(*wmUpdateWSBeginXactionCounters)(ws **);
        wsinfostruct *(*wmUpdateWSEndXactionCounters)(ws **);
        } ifWorkSpaceMgmt_1;
```

A preferred security session management interface can be described as follows:

```
#define SECSESS_ID {/* 3bd42d10-30b8-11cf-aae0-0020af4ca94f */ \
                0x3bd42d10,  \
                0x30b8,      \
                0x11cf,      \
                0xaa,        \
                0xe0,        \
                {0x00, 0x20, 0xaf, 0x4c, 0xa9, 0x4f}  \
                }
#define SECSESS_NAME "Security Session Management"
    typedef const struct
        {
        SECSTATUS(*SecLogon)(const void *hostAuthStr, USBRID_T hToken,
            const void *srvrAuthStr, securityParms **psp);
        SECSTATUS(*SecImpersonate)(WSADECL);
        SECSTATUS(*SecRevertToSelf)(WSADECL);
        SECSTATUS(*SecImpersonateSP)(securityParms * sp);
        SBCSTATUS(*SecRevertToSelfSP)(securityParms * sp);
        SECSTATUS(*SecLogonDefault)(securityParms **psp);
        SECSTATUS(*SecLogonInitialize)(securityParms **psp);
        SECSTATUS(*SecLogonDBA)(securityParms **psp);
        SECSTATUS(*SecImpersonateDBA)(WSADECL);
        void (*SecLogoff)(securityParms * sp);
        SECSTATUS(* SecCheckwSSharing)(securityParms * spOrigin,
            securityParms * spNew);
        } ifSecSess_1;
typedef enum _oesresult {  SUCCESS,
                           FAILURE,
                           FAILURE_WORKSPACE_NOT_AVAILABLE,
                           FAILURE_SESSION_NOT_AVAILABLE,
```

-continued

```
  FAILURE_AUTHENTICATION,
  FAILURE_EXCEPTION_OCCURRED,
  FAILURE_INVALID_ARGUMENT,
  FAILURE_SERVICE_STATE_CHANGED,
  FAILURE_FUNCTION_NOT_AVAILABLE
} OESRESULT;
```

The SHARESESSION function flags the current server session as shareable. This means that another client connection (e.g., through SNAPI or XCA) can use the same session. In addition, SHARESESSION returns the session identifier for the current session as an integer value.

The SESSIONQUERY function is preferably called by the Express Server SPL programming interface: SESSIONQUERY function. Each keyword specifies the type of information wanted about the connection. The data type of SESSIONQUERY's return value depends on the keyword specified and is listed with the keywords in the Table I below.

TABLE I

| KEYWORD | RETURN VALUE | MEANING |
|---|---|---|
| SHARING | BOOLEAN | Indicates whether the client instance allows the client to flag the client session as shareable using the SHARESESSION function. Sharing is turned on and off using a configuration setting. |
| ISSHARABLE | BOOLEAN | Indicates whether the SHARESESSION function has been used in the client session to flag it as sharable. |
| NUMSHARES | INTEGER | Indicates the number of client connections that are currently sharing the client session. |

Figure 2:
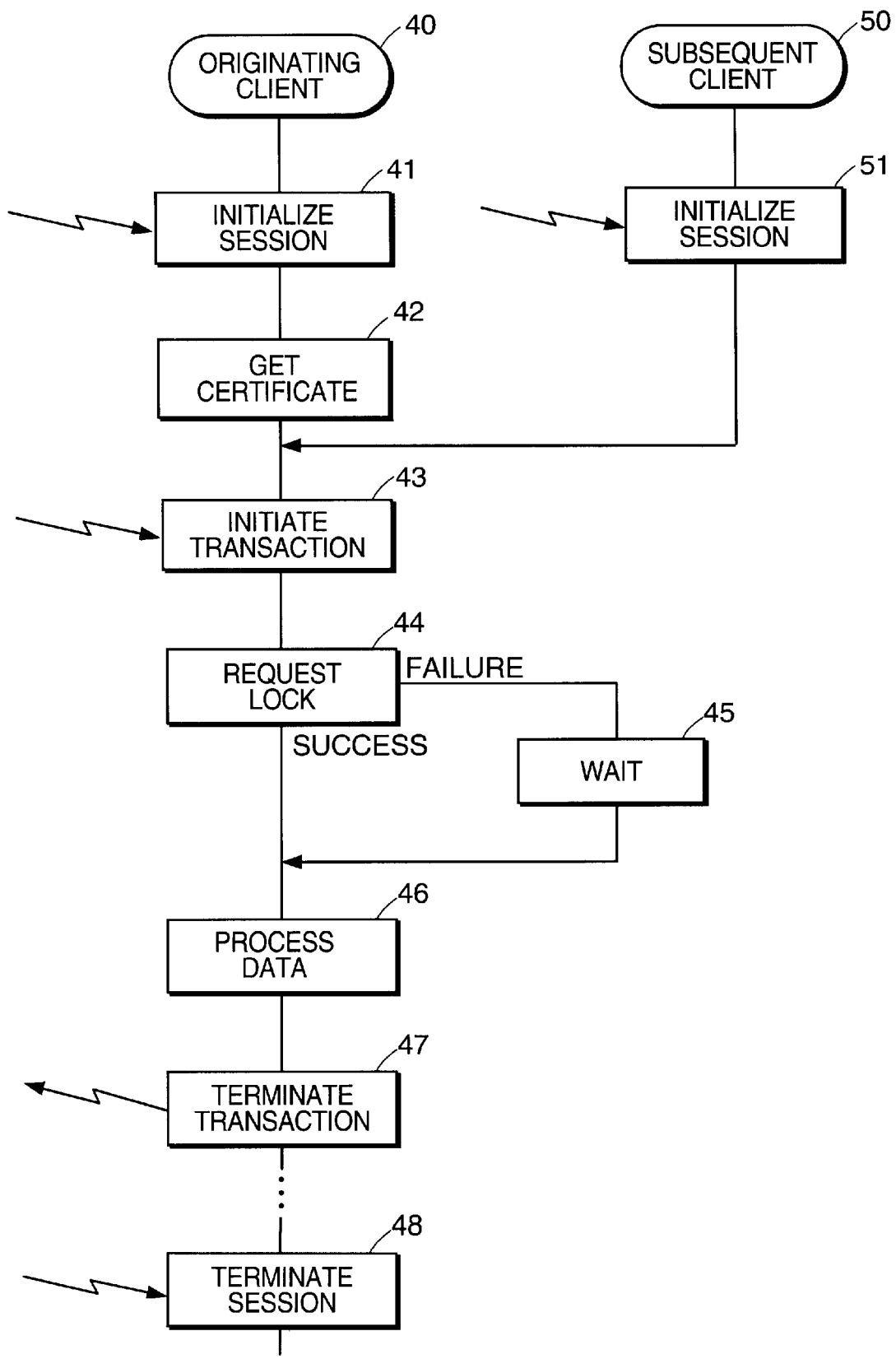
FIG. 2 is a flow chart of a preferred method of sharing session contexts between multiple clients.

FIG. 2 is a flow chart of a preferred method of sharing session contexts between multiple clients. There are two initial entry points for the processing: one for an originating client 41 and one for subsequent clients 51.

Starting with the originating client, at step 41, the originating client connects to the data server 10 (FIG. 1) and creates a session, specifying that the session be brand new, and that the new session can be shared by future client connections. This is accomplished via the following method:

pifSessInitTerm->sessionInit(psessParms,psecurityParms,client, TRUE,TRUE, (hws*)NOPTR, void *)

In response, the session manager 14 (FIG. 1) creates a new session which is assigned a new session handle from the pool of unassigned session handles 22 (FIG. 1). The workspace manager 16 assigns a Workspace with a new workspace handle from the pool of unassigned workspace handles 24 (FIG. 1). The session manager 14 associates the new Workspace with the new session using the mapping table 28 (FIG. 1).

At step 42, the originating client issues the command SHARESESSION. This function returns the certificate needed to allow additional clients to share the session context. The certificate exposes the server's internal workspace handle to the originating client.

Another client can then receive this certificate from the originating client via any inter-process communication mechanism available to them. The certificate provided by the originating client can then submitted by the subsequent client during its session initialization process (step 51), to indicate the session to be shared and to provide for credential's matching to secure the shared session. This is accomplished via the following method:

pifSessInitTerm->sessionnit(psessParms,psecurityParms,client, FALSE,TRUE, &certificate, void *).

If the underlying Workspace has already been terminated, the starting method, pifSessInitTerm->sessionlnit(. . .), would return the result code: FAILURE_WORKSPACE_NOT_AVAILABLE. This indicates to the client that the Workspace no longer exists. That is, there is no longer a session context associated with the certificate.

In response to a successful initialization, the session manager 14 creates a new session which is assigned a new session handle from the pool of unassigned session handles 22. The session manager 14 also associates the pre-existing Workspace identified by the workspace handle in the certificate with the session using the mapping table 28.

A common entry point for either client for transacting with the underlying data is at step 43. At step 43, the client decides to process data in the session. It starts this process by initiating a transaction with the session via the following method:

pifSessInitTerm->sessBeginTransaction(sessHandle, * pwsArray, psessData).

To authenticate the processing activity, the session manager (FIG. 1) calls the method:

pifSecSess->SecCheckWSSharing(&spOrigin,&spNew).

This should succeed, indicating that the requesting client has the credentials to use the session. If this fails, the sessBeginTransaction method for this client also fails.

If successfully authenticated, processing continues to step 44, where the underlying session data is locked via the following two methods:

pifWorkSpaceMgmt->getWSTransactionState(wsHandle, &currstate)

pifWorkSpaceMgmt->setWSTransactionState(wsHandle,currstate, newstate).

The getWSTransactionState method retrieves the current lock state of the underlying session data, which is passed to the setWSTransactionState method with an additional argument specifying the new state, TRANSACTING (manifest constant), indicating that no other session can use the underlying session data. Lockout is guaranteed by the data server technology.

If the lock request is successful, then processing continues to step 46 where the client can process data in the Workspace. If some other client has already locked the Workspace, then processing jumps to step 45, where the requesting client must wait for the data to become available before continuing to step 46.

If the underlying session data is locked, the starting method, pifSessInitTerm->sessBeginTransaction(. . .), would return the result code: FAILURE_WORKSPACE_NOT_AVAILABLE. This indicates to the client that it must wait in line for access to the session. To do this several methods are used by the session manager 14. The method pifSessWs->sessRequestSharedWs(sessHandle,&pNotifyItem,&notify)

puts the client in the interaction queue 26, in arrival order of all requests, by all clients, to access the session. The sessRequestSharedWs(. . .) method returns immediately so that the caller can do other processing, pursue keep-alive protocols with the client, and/or time the queue wait.

The mechanism for waiting involves a mutex/condition-variable pair. The pair is allocated and instantiated by the client, and passed to the session manager in the sessRequestSharedWs function. Based on the return code from sessRequestSharedWs, for example, FAILURE_WORKSPACE_NOT_AVAILABLE, the calling session can efficiently wait, within Express Server, on behalf of the client, using the condition-variable, for Workspace availability, or do other processing as described above. The mutex is used only to control access by the calling session and the transacting session to the condition variable. All mutex/condition-variable pairs are stored by the session manager in the table that maps sessions (clients) to Workspaces.

If the waiting session (client) becomes impatient, it can call method pifSessWs->sessCancelSharedWsRequest(sessHandle,&pNotifyItem,&notify)

to cancel its queued request and return to the client for other instructions.

When finished processing data (step 46) the client terminates the transaction at step 47, with the method:

pifSesInitTerm->sessEndTransaction(hsess sessHandle)

which causes the unlocking of the underlying session data via the following methods:

pifWorkSpaceMgmt->getWSTransactionState(wsHandle, &currstate)

pifWorkSpaceMgmt->setWSTransactionState(wsHandle,currstate, newstate);

this time specifying NOT_TRANSACTING (manifest constant). Step 47 is thus a common exit point for the clients.

Steps 42 through 47 can be repeated by the originating client, and can also be propagated to other clients.

Step 48 is a common entry point to provide a mechanism for any client to terminate its usage of the session, at any time. This is accomplished by calling method:

pifSessInitTerm->sessionTerm(sessHandle);

The data server will keep the underlying session data alive until all clients accessing the session have terminated their session at step 48 by calling sessionTerm(. . .). Detection of the last user's termination causes the destruction of the underlying session data. No more sharing requests can be considered for that session.

Applications can create, and actively share a session as described above. During any given interaction with the session, one client may encounter an error condition that prevents further processing within the session context, for all sessions. In this case, the session context must be terminated. If the session context is terminated due to a severe error, all sessions waiting in the queue are awakened with a code indicating that they cannot proceed against the Workspace and must therefore exit.

FIGS. 3A–3E are schematic block diagrams illustrating the application of the flow chart of FIG. 2 to the block diagram of FIG. 1.

Figure 3A:
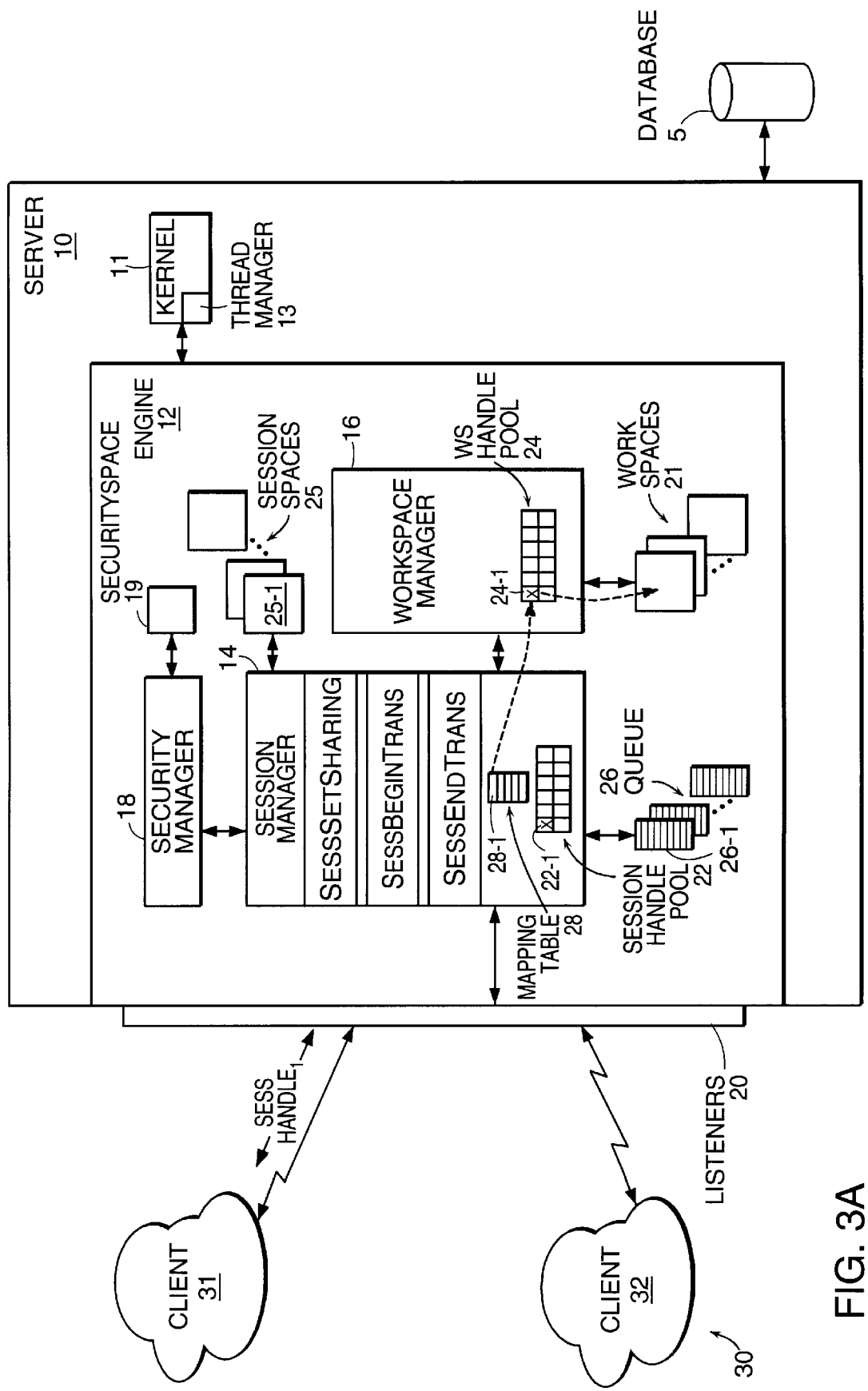
FIGS. 3A–3E are schematic block diagrams illustrating the application of the flow chart of FIG. 2 to the block diagram of FIG. 1.

In FIG. 3A, the originating client 31 has initialized a session which can include allocation of a Sessionspace 25-1. The session manager 14 has assigned a session handle 22-1 (sessHandle$_1$) from the pool of session handles 22. Similarly, the workspace manager has allocated a Workspace 21 -1 and assigned a workspace handle 24-1 (wsHandle$_1$) from the pool of workspace handles 24 to identify the underlying Workspace 21-1. The session manager has set this session's entry 28-1 in the mapping table 28 to reference the current workspace handle 24-1 (wsHandle$_1$) for the current session (sessHandle$_1$). This reference to the workspace handle can be accomplish via storage of the workspace handle (wsHandle$_1$). In addition, the session manager 14 has initialized an interaction queue 26-1 for the assigned Workspace 21 - 1. To the client 31, all that is known is its unique session handle (sessHandle$_1$) which is used to tag requests and information exchanged between the client 31 and server 10.

Figure 3B:
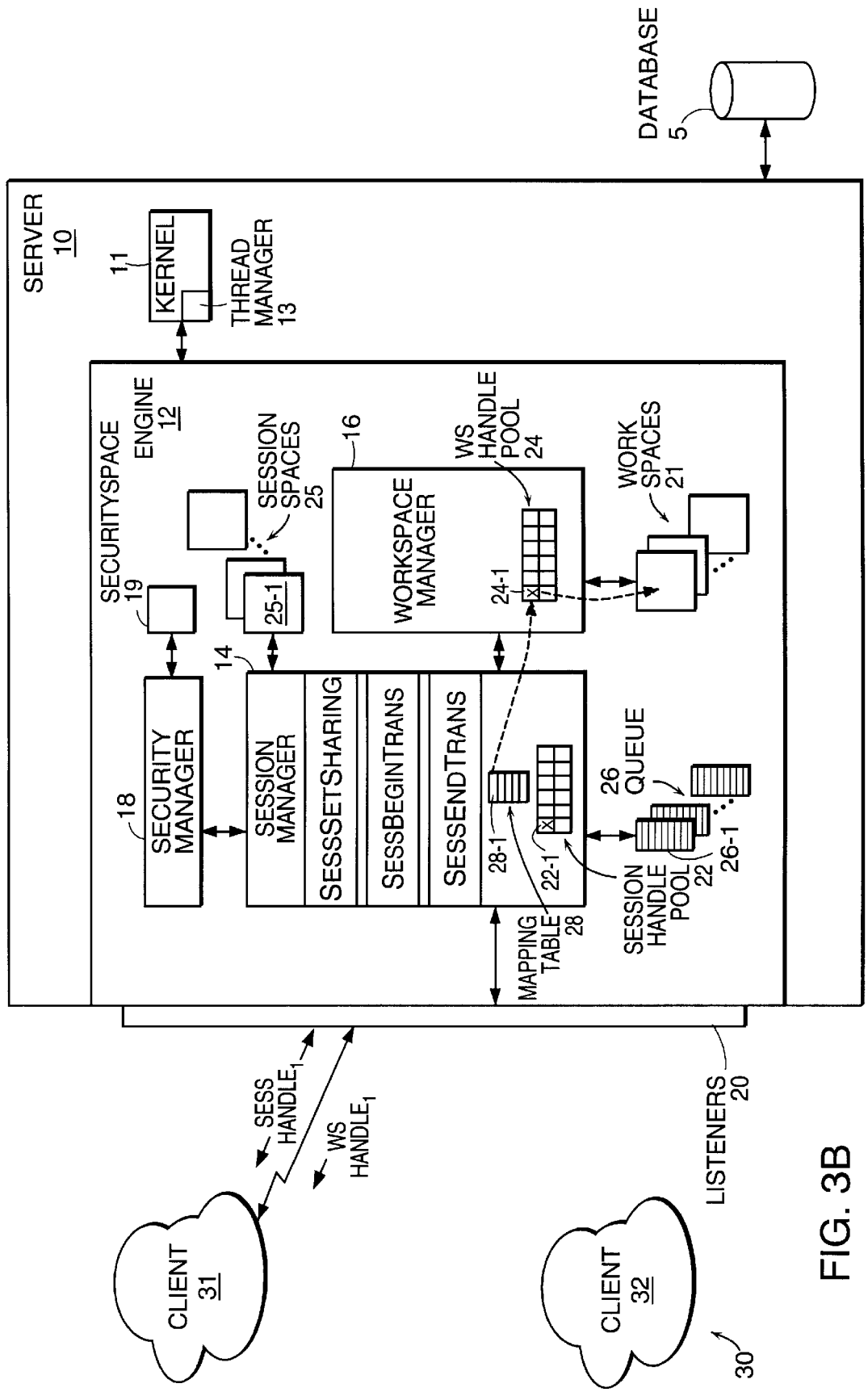

In FIG. 3B, the originating client 31 has requested a certificate identifying its workspace handle (wsHandle$_1$) in preparation for sharing its session context with another client. In response, the session manager passes the assigned workspace handle (wshandle$_1$) to the client 31. The client can now make use of the workspace handle (wsHandle$_1$). For clarity of description, only the workspace handle is illustrated. The certificate, however, can include additional information which can be used, for example, by the security manager 18 (FIG. 1) to authenticate clients.

Figure 3C:
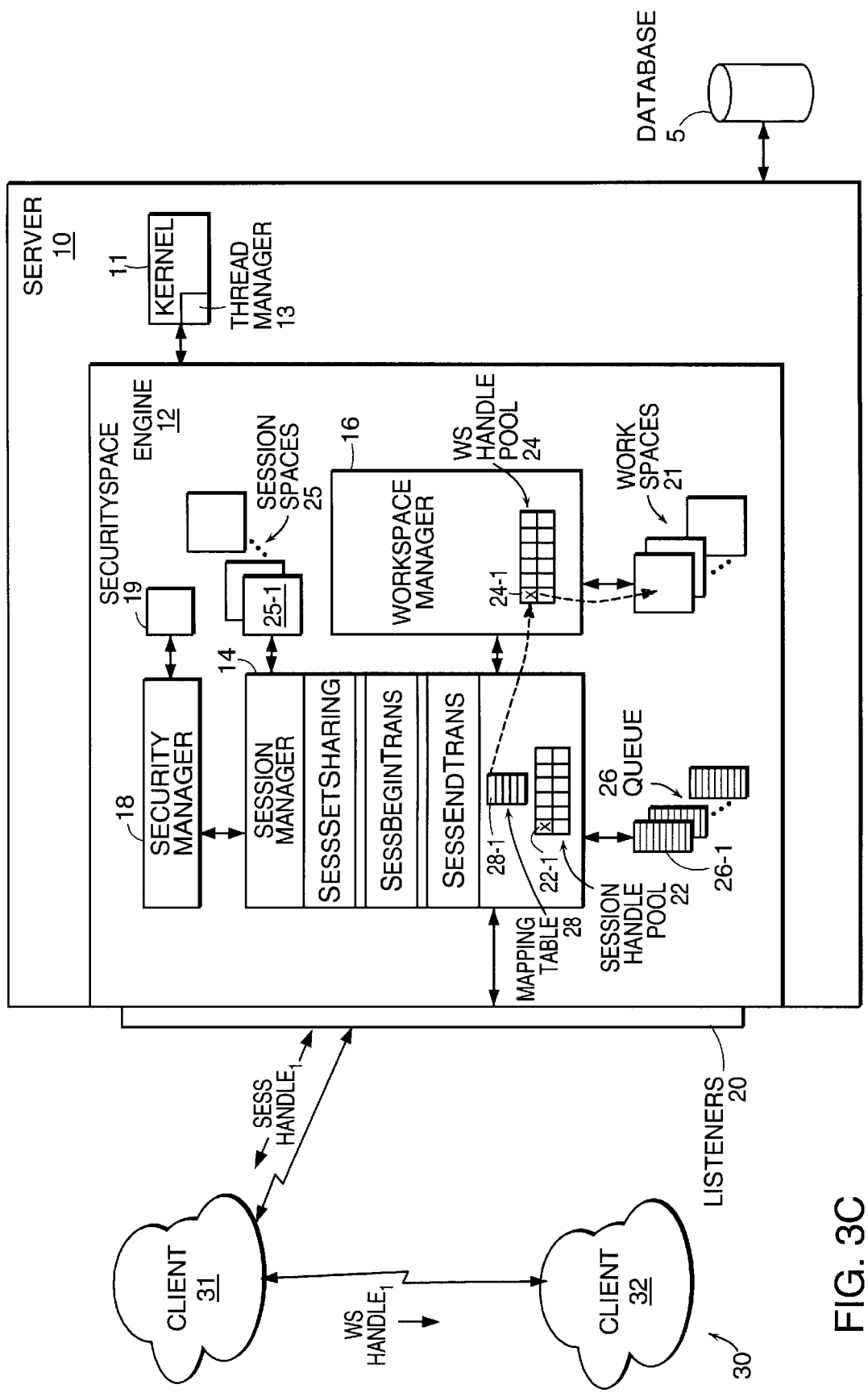

In FIG. 3C, the originating client 31 sends its workspace handle (wsHandle$_1$) to another, independent client 32. The second client 32 can be another application on the desktop of the workstation running the originating client 31 or the two clients 31, 32 can be on different workstations. In fact, the two clients can be in different client communities using different protocols to communicate with the server 10. The session manager 14 treats all such clients equally in terms of session sharing. The security manager 18, however, can block certain client communities from sharing session context with other clients if necessary.

Figure 3D:
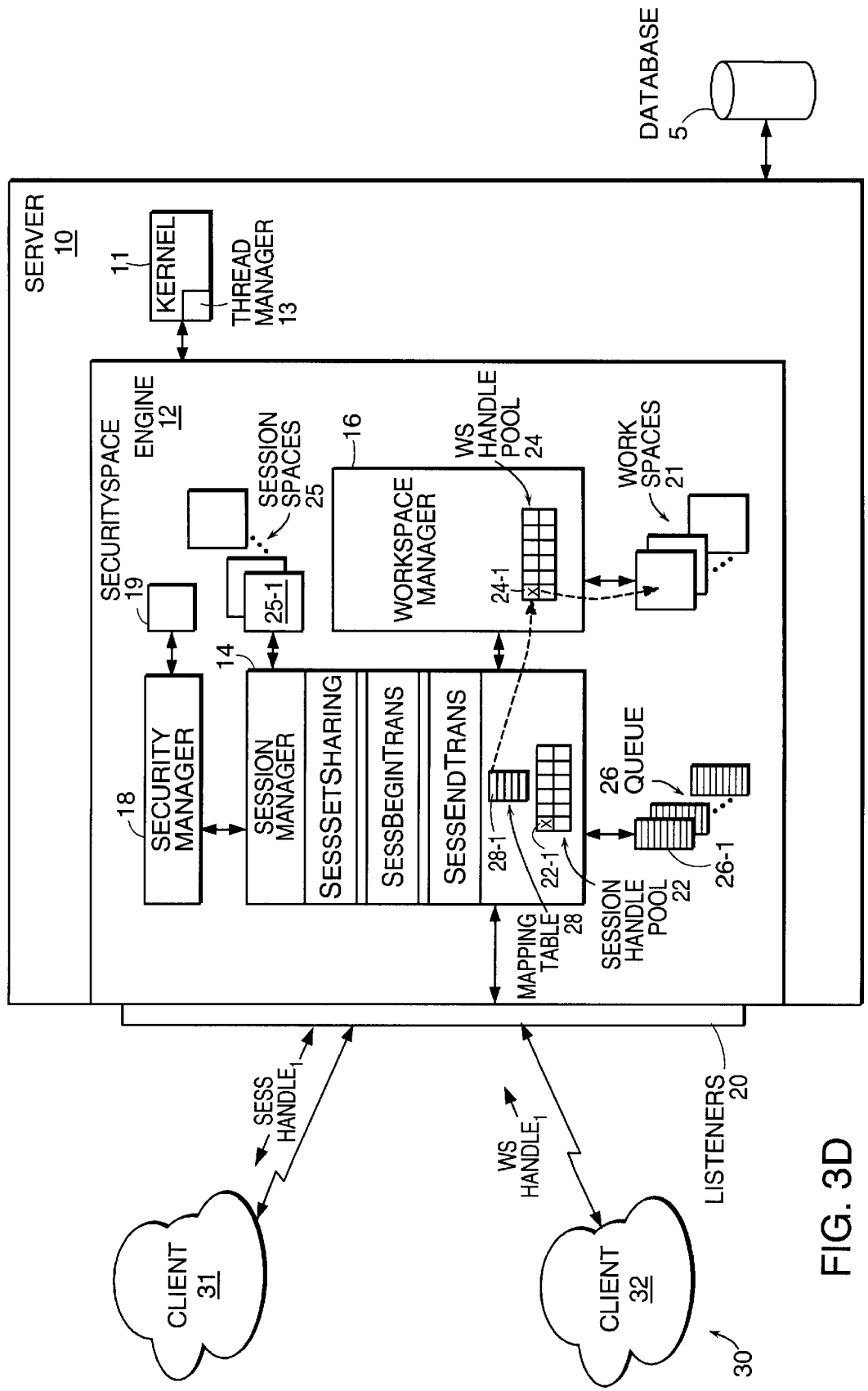

In FIG. 3D, the second client 32 passes the received workspace handle (wsHandle$_1$) to the session manager as part of its session initialization procedure. By doing so, the second client 32 hopes to share the Workspace of the originating client 31.

It will be assumed for illustrative purposes that the second client is authorized to share the Workspace.

Figure 3E:
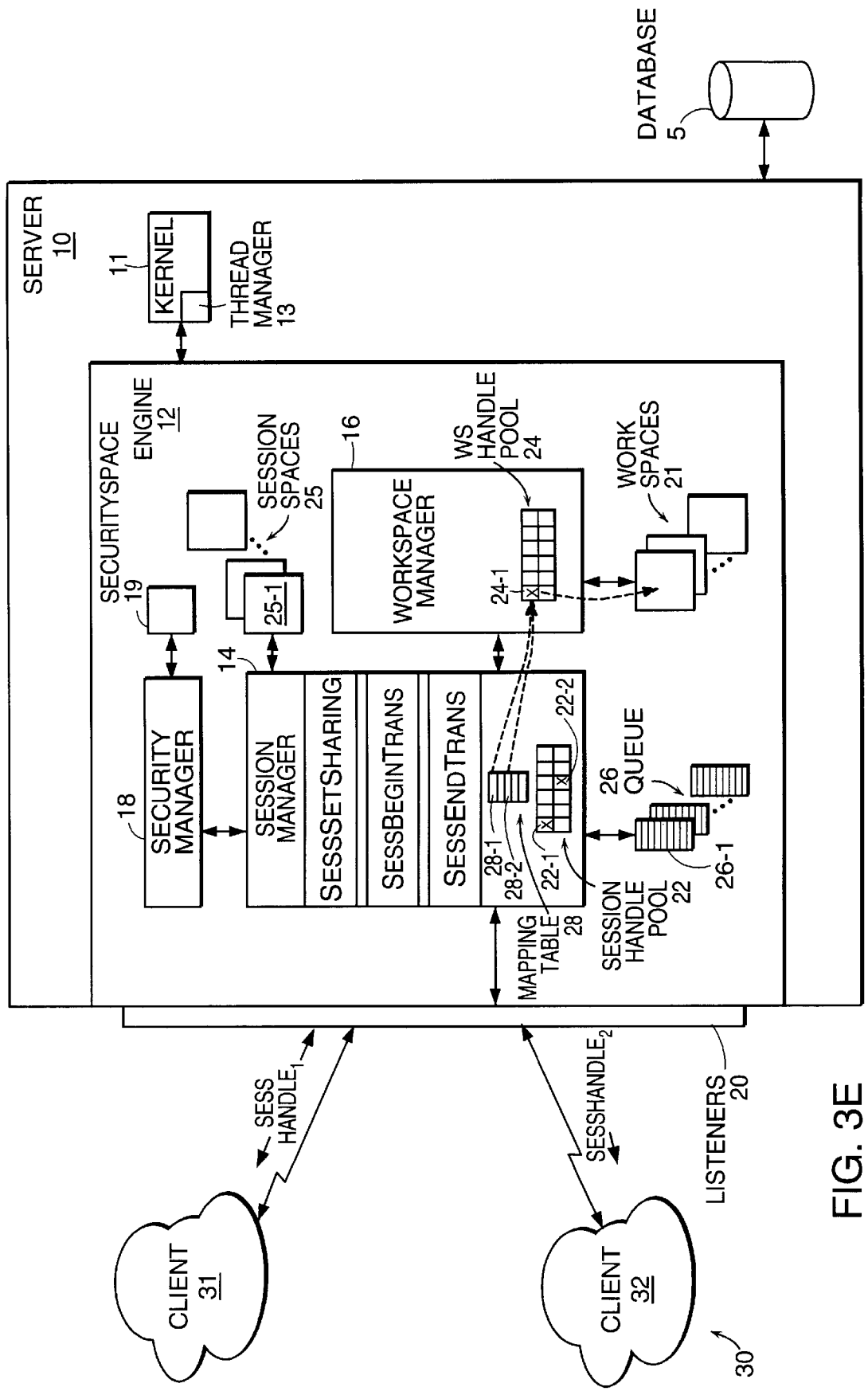

In FIG. 3E, the session manager 14 has allocated a Sessionspace 25-2 and assigned a unique session handle 22-2 (sessHandle$_2$) to the second client from the pool of session handles 22. The workspace manager 16, however, is not called upon to assign a Workspace. Instead, the session manager 14, updates the mapping table 28 for this session's entry 28-2 to reference the Workspace 21-1 of the originating client 31, using the workspace handle 24-1 (wsHandle$_1$) provided by the second client 32. The session handle (sessHandle$_2$) for this client 32 is then passed back to the client 32 to permit the server 10 and client 32 to communicate. Both clients 31, 32 can now use their respective and unique session handles 22-1, 22-2 to access the same data values in a shared Workspace 21-1 on the server 10.

As noted above, both clients 31, 32 can continue operations against the shared session, leaving the coordination of all interactions with the underlying session to the data server 10. Interactions are processed from the interaction queue 26-1 in arrival order, with protection of the session data through a session data transaction life lockout mechanism. Also, additional clients can connect to the data server 10 and share the same session context, limited only by the data server configuration, available hardware resources, and authentication considerations. In addition, the originating client 31 can end its session, with other clients active, and the data server 10 will preserve the underlying session data until the last session is ended, then terminate the session data.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. On a server computer having resources allocable for private use by clients, a method of sharing a resource on the server computer between a plurality of clients, comprising:

assigning a respective client identifier to a plurality of clients interacting with the server computer;

allocating a private resource having a private resource identifier to a first client having a first client identifier;

mapping the first client identifier to the private resource identifier to facilitate communication between the first client and the private resource; and in response to a receipt of the private resource identifier from a second client having a second client identifier, mapping the second client identifier to the private resource identifier to facilitate communication between the second client and the private resource.

2. The method of claim 1 wherein assigning a client identifier comprises assigning a unique handle for each client session on the server computer.

3. The method of claim 1 wherein assigning a client identifier comprises selecting a client identifier from a pool of identifiers.

4. The method of claim 1 wherein the private resource includes data.

5. The method of claim 1 wherein the private resource is shared between the first and second clients.

6. The method of claim 1 father comprising exposing the resource identifier to the first client in response to a request from the first client.

7. On a server computer having resources allocable for private use by clients, a method of sharing a resource on the server computer between a plurality of clients, comprising:

assigning a first session identifier to a first client interacting with a first resource on a server;

assigning a first resource identifier to identify the first resource on the server;

interacting with the first client using the first session identifier to access the first resource;

providing a certificate identifying the first resource to the first client;

assigning a second session identifier to a second client, the second client providing the server with a copy of the certificate;

mapping the second session identifier to the first resource using the first resource identifier derived from the certificate; and interacting with the second client using the second session identifier to access the first resource.

8. The method of claim 7 wherein assigning session identifiers comprises assigning a unique handle for each client sessions on the server computer.

9. The method of claim 7 wherein assigning session identifiers comprises selecting a session identifier from a pool of session identifiers.

10. The method of claim 7 wherein assigning the first resource identifier comprises selecting the first resource identifier from a pool of resource identifiers.

11. The method of claim 7 wherein interacting with the first client comprises modifying data values retrieved from a database.

12. The method of claim 11 wherein interacting with the second client comprises modifying the retrieved data values.

13. The method of claim 7 wherein the first and second clients are application programs executing on respective client computers.

14. The method of claim 13 wherein the client computers interact with the server computer using respective communication protocols.

15. The method of claim 7 wherein providing the certificate is responsive to a command from the fast client to mark the first resource as sharable.

16. The method of claim 7 further comprising:

terminating the first session, and after the termination, maintaining the fist resource for access by the second session.

17. The method of claim 7 further comprising, in response to an interaction from the second client while the first session is active, destroying the first resource.

18. The method of claim 17 further comprising notifying the second client of the destruction of the first resource.

19. The method of claim 7 further comprising queuing the interactions from the first and second clients for serial access to the first resource.

20. The method of claim 19 wherein the interactions are queued in order of arrival at the server computer.

21. The method of claim 7 further comprising, before mapping, authenticating the second client.

22. The method of claim 7 wherein the first resource includes a state and the method further comprises interrogating the state of the first resource.

23. An article of manufacture, comprising:

a machine-readable medium;

a computer-implemented method embodied in the machine-readable medium to a share resource on a server computer having resources allocable for private use by clients between a plurality of clients, the method comprising:

assigning a respective client identifier to a plurality of clients interacting with the server computer;

allocating a private resource having a private resource identifier to a first client having a first client identifier;

mapping the first client identifier to the private resource identifier to facilitate communication between the first client and the private resource; and in response to a receipt of the private resource identifier from a second client having a second client identifier, mapping the second client identifier to the private resource identifier to facilitate communication between the second client and the private resource.

24. The article of claim 23 wherein assigning a client identifier comprises assigning a unique handle for each client session on the server computer.

25. The article of claim 23 wherein assigning a client identifier comprises selecting a client identifier from a pool of identifiers.

26. The article of claim 23 wherein the private resource includes data.

27. The article of claim 23 wherein the private resource is shared between the first and second clients.

28. The article of claim 23 wherein the method further comprises exposing the resource identifier to the first client in response to a request from the first client.

29. An article of manufacture, comprising:
a machine-readable medium;
a computer-implemented method embodied in the machine-readable medium to share a resource on a server computer having resources allocable for private use by clients between a plurality of clients, the method comprising:
assigning a first session identifier to a first client interacting with a first resource on a server;
assigning a first resource identifier to identify the first resource on the server;
interacting with the first client using the first session identifier to access the first resource;
providing a certificate identifying the first resource to the first client;
assigning a second session identifier to a second client, the second client providing the server with a copy of the certificate;
mapping the second session identifier to the first resource using the first resource identifier derived from the certificate; and
interacting with the second client using the second session identifier to access the first resource.

30. The article of claim 29 wherein the computer-implemented method of assigning session identifiers comprises assigning a unique handle for each client sessions on the server computer.

31. The article of claim 29 wherein the computer-implemented method of assigning session identifiers comprises selecting a session identifier from a pool of session identifiers.

32. The article of claim 29 wherein the computer-implemented method of assigning the first resource identifier comprises selecting the first resource identifier from a pool of resource identifiers.

33. The article of claim 29 wherein the computer-implemented method of interacting with the first client comprises modifying data values retrieved from a database.

34. The article of claim 33 wherein the computer-implemented method of interacting with the second client comprises modifying the retrieved data values.

35. The article of claim 29 wherein the first and second clients are application programs executing on respective client computers.

36. The article of claim 35 wherein the client computers interact with the server computer using respective communication protocols.

37. The article of claim 29 wherein the computer-implemented method of providing the certificate is responsive to a command from the first client to mark the first resource as sharable.

38. The auricle of claim 29 wherein the computer-implemented method further comprises:
terminating the first session; and
after the termination, maintaining the first resource for access by the second session.

39. The article of claim 29 wherein the computer-implemented method further comprises, in response to an interaction from the second client while the first session is active, destroying the first resource.

40. The article of claim 39 wherein The computer-implemented method further comprises notifying the second client of the destruction of the first resource.

41. The article of claim 29 further comprises queuing the interactions from the first and second clients for serial access to the first resource.

42. The article of claim 41 wherein the interactions are queued in order of arrival at the server computer.

43. The article of claim 29 wherein the computer-implemented method further comprises, before mapping, authenticating the second client.

44. The article of claim 29 wherein the first resource includes a state and the method further comprises interrogating the state of the first resource.

45. On a server computer having resources allocable for private use by clients, a system for sharing a resource on the server computer between a plurality of clients, comprising:
a first session identifier assigned to a first client interacting with a first resource on a server;
a first resource identifier assigned to identify the first resource on the server;
a first mechanism managing use of the first session identifier by the first client to access the first resource;
a certificate identifying the first resource to the first client;
a second session identifier assigned to a second client, the second client providing the server with a copy of the certificate;
a map of the second session identifier to the first resource based on the first resource identifier derived from the certificate; and
the first mechanism managing use of the second client using the second session identifier by the second client to access the first resource.

46. The system of claim 45 wherein the session identifiers comprise a unique handle for each client sessions on the server computer.

47. The system of claim 45 further comprises a pool of session identifiers.

48. The system of claim 45 further comprises a pool of resource identifiers.

49. The system of claim 45 wherein the first and second clients are application programs executing on respective client computers.

50. The system of claim 49 wherein the client computers interact with the server computer using respective communication protocols.

51. The system of claim 45 wherein the certificate is provided in response to a command from the first client to mark the first resource as sharable.

52. The system of claim 45 further comprising:
a second mechanism to maintain the first resource for access by the second session after termination of the first session.

53. The system of claim 45 further comprising a queue of interactions from the first and second clients for serial access to the first resource.

54. The system of claim 53 wherein the interactions are queued in order of arrival at the server computer.

* * * * *